US012763323B2

(12) United States Patent
Han et al.

(10) Patent No.: US 12,763,323 B2
(45) Date of Patent: Oct. 13, 2026

(54) ANODE FOR LITHIUM SECONDARY BATTERY AND LITHIUM SECONDARY BATTERY INCLUDING THE SAME

(71) Applicant: SK ON CO., LTD., Seoul (KR)

(72) Inventors: Jun Hee Han, Daejeon (KR); Moon Sung Kim, Daejeon (KR); Hyo Mi Kim, Daejeon (KR); Sang Baek Ryu, Daejeon (KR); Seung Hyun Yook, Daejeon (KR); Hwan Ho Jang, Daejeon (KR); Da Bin Chung, Daejeon (KR); Da Hye Park, Daejeon (KR); Sang In Bang, Daejeon (KR); Young Mo Yang, Daejeon (KR); Ju Ho Chung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 161 days.

(21) Appl. No.: 18/532,180

(22) Filed: Dec. 7, 2023

(65) Prior Publication Data

US 2024/0194861 A1 Jun. 13, 2024

(30) Foreign Application Priority Data

Dec. 7, 2022 (KR) ........................ 10-2022-0169568

(51) Int. Cl.
*H01M 4/587* (2010.01)
*H01M 4/133* (2010.01)
(Continued)

(52) U.S. Cl.
CPC ........... *H01M 4/366* (2013.01); *H01M 4/485* (2013.01); *H01M 4/587* (2013.01);
(Continued)

(58) Field of Classification Search
None
See application file for complete search history.

(56) References Cited

U.S. PATENT DOCUMENTS

2021/0111410 A1 4/2021 Huang et al.
2021/0234191 A1 * 7/2021 Lee ....................... H01M 4/583
(Continued)

FOREIGN PATENT DOCUMENTS

CN 113871573 A 12/2021
CN 114975903 A 8/2022
(Continued)

OTHER PUBLICATIONS

Zeferino Gonzalez, I. et al., "Silicon doped carbon nanotubes as high energy anode for lithium-ion batteries," Materials Today Communications 30 (2022) 103158 (9 pages).

*Primary Examiner* — Yoshitoshi Takeuchi
(74) *Attorney, Agent, or Firm* — IP&T GROUP LLP

(57) ABSTRACT

An anode active material for a secondary battery according to an embodiment of the disclosed technology includes an anode current collector, a first anode active material layer on at least one surface of the anode current collector and including a graphite-based active material and a silicon-based active material doped with a metal element, and a second anode active material layer on the first anode active material layer and including a porous structure. The porous structure includes a carbon-based particle having pores and a silicon-containing coating formed on a surface of the carbon-based particle.

17 Claims, 2 Drawing Sheets

(51) Int. Cl.

| | |
|---|---|
| ***H01M 4/134*** | (2010.01) |
| ***H01M 4/1395*** | (2010.01) |
| ***H01M 4/36*** | (2006.01) |
| ***H01M 4/485*** | (2010.01) |
| ***H01M 4/583*** | (2010.01) |
| ***H01M 10/052*** | (2010.01) |
| *H01M 4/02* | (2006.01) |

(52) U.S. Cl.

CPC .... *H01M 10/052* (2013.01); *H01M 2004/021* (2013.01); *H01M 2004/027* (2013.01)

(56) References Cited

U.S. PATENT DOCUMENTS

| | | | | |
|---|---|---|---|---|
| 2021/0249662 | A1 | 8/2021 | Inoue et al. | |
| 2022/0310991 | A1* | 9/2022 | Lee | H01M 4/13 |
| 2024/0120465 | A1* | 4/2024 | Jang | H01M 4/58 |
| 2024/0136504 | A1* | 4/2024 | Kim | H01M 4/0404 |
| 2024/0347708 | A1* | 10/2024 | Jang | H01M 4/583 |

FOREIGN PATENT DOCUMENTS

| | | | |
|---|---|---|---|
| CN | 115084459 | A | 9/2022 |
| JP | 2021-068706 | A | 4/2021 |
| KR | 10-1591698 | B | 1/2016 |
| KR | 10-1725381 | B1 | 4/2017 |
| KR | 10-2018-0078176 | A | 7/2018 |
| KR | 10-2020-0047287 | A | 5/2020 |
| KR | 10-2021-0096814 | A | 8/2021 |
| KR | 10-2022-0118070 | A | 8/2022 |

* cited by examiner

ANODE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This patent document claims the priority and benefits of Korean Patent Application No. 10-2022-0169568 filed in the Korean Intellectual Property Office (KIPO) on Dec. 7, 2022, the entire disclosure of which is incorporated herein by reference.

TECHNICAL FIELD

The disclosed technology relates to an anode for a lithium secondary battery and a lithium secondary battery including the anode.

BACKGROUND

The rapid growth of electric vehicles and portable devices, such as camcorders, mobile phones, and laptop computers, has brought increasing demands for secondary batteries which can be charged and discharged repeatedly. Battery packs that include the secondary batteries are being developed and applied as a power source for an eco-friendly vehicle such as an electric vehicle.

Examples of the secondary batteries may include lithium secondary batteries, nickel-cadmium batteries, and nickel-hydrogen batteries. The lithium secondary batteries are being widely used due to high operational voltage and energy density per unit weight, a high charging rate, a compact dimension, etc.

A lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

SUMMARY

The disclosed technology can be implemented in some embodiments to provide an anode for a lithium secondary battery having improved capacity and life-span properties.

In an aspect of the disclosed technology, a lithium secondary battery may include an anode for a lithium secondary battery with improved capacity and life-span properties.

An anode for a lithium secondary battery includes an anode current collector, a first anode active material layer on at least one surface of the anode current collector and including a graphite-based active material and a silicon-based active material doped with a metal element, and a second anode active material layer on the first anode active material layer and including a porous structure. The porous structure includes a carbon-based particle having pores and a silicon-containing coating formed at an inside of the pores or on a surface of the carbon-based particle. In some implementations, the term "graphite-based active material" may be used to indicate an active material that includes graphite. In some implementations, the term "silicon-based active material" may be used to indicate an active material that includes silicon. In some implementations, the term "carbon-based particle" may be used to indicate a particle that includes carbon.

In some embodiments, a content of the metal element doped in the silicon-based active material may be in a range from 7 wt % to 17 wt % based on a total weight of the silicon-based active material.

In some embodiments, the metal element may include at least one selected from the group consisting of Mg, Li, Al, Ca, Fe, Ti and V.

In some embodiments, the metal element may include Mg.

In some embodiments, a Mg1s spectrum of a surface of the silicon-based active material measured by an X-ray photoelectron spectroscopy (XPS) may satisfy Formula 1.

$$P_{Mg}/(P_{Mg}+P_{MgO}) \leq 0.6 \quad \text{[Formula 1]}$$

In Formula 1, $P_{Mg}$ represents an area of a 1303 eV peak in the Mg1s spectrum, and $P_{Mg}O$ represents an area of a 1304.5 eV peak of the Mg1s spectrum.

In some embodiments, a content of the silicon-based active material may be in a range from 0.1 wt % to 35 wt % based on a total weight of the first anode active material layer.

In some embodiments, the silicon-based active material may include a silicon-based active material particle and a carbon coating formed on the silicon-based active material particle.

In some embodiments, the graphite-based active material may include artificial graphite and natural graphite. A weight of natural graphite included in the first anode active material layer may be equal to or less than a weight of artificial graphite included in the first anode active material layer.

In some embodiments, a ratio of the weight of natural graphite included in the first anode active material layer relative to the weight of artificial graphite included in the first anode active material layer may be in a range from 0.025 to 1.

In some embodiments, the second anode active material layer may further include artificial graphite and natural graphite. A weight of natural graphite included in the second anode active material layer may be equal to or less than a weight of artificial graphite included in the second anode active material layer.

In some embodiments, a ratio of the weight of natural graphite included in the second anode active material layer relative to the weight of artificial graphite included in the second anode active material layer may be in a range from 0.025 to 1.

In some embodiments, a content of the porous structure may be in a range from 0.1 wt % to 35 wt % based on a total weight of the second anode active material layer.

In some embodiments, a thickness of the second anode active material layer may be 0.5% to 50% of a total thickness of the first anode active material layer and the second anode active material layer.

In some embodiments, the carbon-based particle included in the porous structure may include at least one selected from the group consisting of an activated carbon, a carbon nanotube, a carbon nanowire, graphene, a carbon fiber, carbon black, graphite, a porous carbon, a pyrolyzed cryogel, a pyrolyzed xerogel and a pyrolyzed aerogel.

In some embodiments, a pore size of the pores included in the carbon-based particle may be 20 nm or less.

In some embodiments, silicon included in the silicon-containing coating may have an amorphous structure or a crystallite size of 7 nm or less as measured through an X-ray diffraction (XRD) analysis.

In some embodiments, the crystallite size of silicon included in the silicon-containing coating may be measured based on Formula 2.

$$L = \frac{0.9\lambda}{\beta\cos\theta} \quad \text{[Formula 2]}$$

In Formula 2 above, L represents the crystallite size (nm), λ represents an X-ray wavelength (nm), β represents a full width at half maximum (rad) of a peak of a (111) plane of silicon included in the silicon-containing coating, and θ represents a diffraction angle (rad).

A lithium secondary battery includes an anode for a lithium secondary battery according to the above-described embodiments, and a cathode facing the anode.

In an embodiment of the disclosed technology, swelling of a silicon-based active material may be reduced to improve a capacity retention of a lithium secondary battery during repeated charging and discharging.

In an embodiment of the disclosed technology, cracks caused by a difference in volume expansion rations between carbon and silicon during charging and discharging of the secondary battery may be prevented.

In an embodiment of the disclosed technology, a secondary battery having high capacity and high energy density may be implemented while alleviating a volume expansion of the silicon-based active material.

The anode and the lithium secondary battery of the disclosed technology may be widely applied in green technology fields such as an electric vehicle, a battery charging station, solar power generation wind power generation using other batteries, etc. The anode and the lithium secondary battery according to the disclosed technology may be used for eco-friendly electric vehicles and hybrid vehicles to prevent a climate change by suppressing air pollution and greenhouse gas emissions. etc.

DETAILED DESCRIPTION OF THE EMBODIMENTS

Section headings are used in the present document only for ease of understanding and do not limit scope of the embodiments to the section in which they are described.

With the broadening applications of lithium secondary batteries, high-power, high-capacity lithium secondary batteries have been attracting attention. An anode of a lithium secondary battery, among other things, may contain an anode active material, and, as an example, high-capacity silicon materials may be used together with carbon as the anode active material to provide improved battery performance.

With the presence of both silicon and carbon in the anode active material, the difference between the volume expansion ratio of silicon and the volume expansion ratio of carbon may lead undesired effects, e.g., creating cracks in the anode and thereby undesirably exposing materials contained in the anode to an electrolyte solution outside the anode during the repeated charging and discharging cycles.

In order to address such issues, the disclosed technology can be implemented in some embodiments to provide an anode for a lithium secondary battery including a plurality of anode active material layers. In addition, the disclosed technology can be implemented in some embodiments to provide a lithium secondary battery including the anode. In some implementations, the term "anode" may be used to indicate an anode for a lithium secondary battery. In some implementations, the term "secondary battery" may be used to indicate a lithium secondary battery. Reference will now be made in detail to embodiments of the disclosed technology, examples of which are illustrated in the accompanying drawings. However, the following description is merely an example and does not intended to limit the disclosed technology to a specific implementation.

Figure 1:
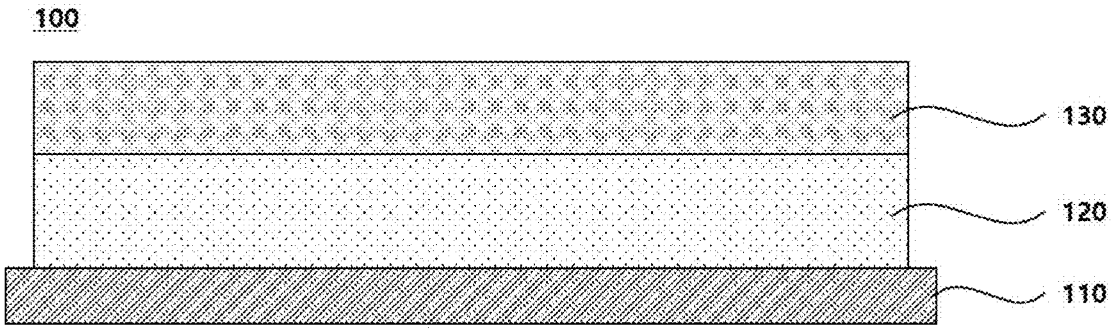
FIG. 1 is a schematic cross-sectional view illustrating an anode for a lithium secondary battery based on some example embodiments.

FIG. 1 is a schematic cross-sectional view illustrating an anode for a lithium secondary battery based on some example embodiments.

Referring to FIG. 1, an anode 100 may include an anode current collector 110, a first anode active material layer 120 and a second anode active material layer 130.

For example, the anode current collector 110 may include a copper foil, a nickel foil, a stainless steel foil, a titanium foil, a nickel foam, a copper foam, a polymer substrate coated with a conductive metal, etc. The copper foil, the nickel foil, stainless steel foil, the titanium foil, the nickel foam, copper foam, and the polymer substrate coated with a conductive metal may be used alone or a combination of two or more of the copper foil, the nickel foil, stainless steel foil, the titanium foil, the nickel foam, copper foam, and the polymer substrate coated with a conductive metal may be used. For example, the anode current collector 110 may have a thickness of 10 μm to 50 μm.

The first anode active material layer 120 including a silicon-based active material and a graphite-based active material is formed on at least one surface of the anode current collector 110. In an embodiment, the first anode active material layer 120 may be in a direct contact with the anode current collector 110.

The silicon-based active material is doped with a metal element. Accordingly, swelling of the silicon-based active material may be reduced, and a capacity retention of the lithium secondary battery may be improved during repeated charging and discharging.

In some embodiments, a content of the metal element doped in the silicon-based active material may be in a range from 7 weight percent (wt %) to 17 wt %, and, in some embodiments, may be in a range from 10 wt % to 17 wt % based on a total weight of the silicon-based active material. Within this range, high-capacity properties from silicon may be maintained while improving cycle properties from doping.

In some embodiments, the metal element may include at least one selected from the group consisting of Mg, Li, Al, Ca, Fe, Ti and V.

In an embodiment, the metal element may include Mg. For example, Mg may be included as a doping element in the silicon-based active material, so that a volume expansion of the silicon-based active material may be reduced. Accordingly, life-span properties of the lithium secondary battery may be improved.

For example, the Mg doping may be performed by calcining a mixture of the silicon-based active material and a Mg compound at a temperature of 900° C. to 1,000° C.

For example, the silicon-based active material may be formed by mixing and depositing a raw material (e.g., Si, $SiO_2$, etc.) of the silicon-based active material.

The mixing may be performed under an inert atmosphere in a mixing device such as a tumbler mixer.

The calcination may be performed in the above temperature range, so that the metal doping may be sufficiently performed, and an excessive increase of a silicon crystal size may be prevented, thereby preventing deterioration of capacity and life-span properties of the anode.

For example, doping of Mg or another metal may be performed by mixing and firing (2-step process) the silicon-based active material and a compound of a metal element after preparing the silicon-based active material as described above.

For example, doping of Mg or another metal may be performed by mixing and firing (one-step process) a raw material of the silicon-based active material (e.g., Si, $SiO_2$, etc.) and a raw material of the metal element.

For example, any doping method may be employed without a particular limitation.

In some embodiments, the silicon-based active material doped with Mg, or another metal element may be washed with a cleaning solvent. For example, the cleaning solvent may include water, an organic solvent (e.g., ethanol, methanol, acetone, hexane, etc.) and/or an acidic solvent (e.g., acetic acid, citric acid, hydrochloric acid, nitric acid, sulfuric acid, etc.). The organic solvent, the acidic solvent and water may be used alone or a combination of two or more of the organic solvent, the acidic solvent and water may be used.

In some embodiments, the Mg compound used for the doping may include at least one selected from the group consisting of magnesium (Mg), magnesium hydroxide ($Mg(OH)_2$), magnesium carbonate ($MgCO_3$) and magnesium oxide (MgO).

In some embodiments, a Mg1s spectrum of a surface of the silicon-based active material measured through an X-ray photoelectron spectroscopy (XPS) may satisfy Formula 1 below.

$$P_{Mg}/(P_{Mg}+P_{Mg}O)\leq 0.6 \quad \text{[Formula 1]}$$

In Formula 1, $P_{Mg}$ represents an area of a 1303 eV peak in the Mg1s spectrum, and $P_{Mg}O$ represents an area of a 1304.5 eV peak of the Mg1s spectrum.

For example, $P_{Mg}$ may be an area of a peak (1303 eV) representing a magnesium element, and $P_{Mg}o$ may be an area of a peak (1304.5 eV) representing a combination of the magnesium element and an oxygen element. For example, the $P_{Mg}/(P_{Mg}+P_{Mg}o)$ value of Formula 1 may indicate a ratio of a magnesium metal among the magnesium metal, magnesium oxide and magnesium hydroxide present on the surface of the silicon-based active material.

In the XPS spectrum that satisfies Formula 1, side reactions caused by a conversion of magnesium remaining on the surface of the silicon-based active material to magnesium hydroxide may be suppressed. Accordingly, deterioration of life-span properties of the silicon-based active material may be prevented.

In some embodiments, the silicon-based active material may include silicon-based active material particles.

For example, the silicon-based active material particles may include at least one selected from the group consisting of Si, SiOx (0<x<2), a Si-Q alloy (Q is an element selected from the group consisting of an alkali metal, an alkaline earth metal, a group 13 element, a group 14 element, a group 15 element, a group 16 element, a transition metal, a rare earth element, and a combination thereof, but excludes Si), and a Si-carbon composite. For example, the silicon-based active material particle may include a mixture of at least one selected from the above group and $SiO_2$. In some embodiments, the silicon-based active material particle may be Si or SiOx (0<x<2), and may be SiOx (0<x<2) in one embodiment.

In some embodiments, the silicon-based active material may further include a carbon coating formed on the silicon-based active material particle. Accordingly, contact of the silicon-based active material particles with moisture in air and/or water in an anode slurry may be prevented. Therefore, reduction of a discharge capacity of the secondary battery may be suppressed.

For example, a content of the carbon coating may be in a range from 2 wt % to 12 wt % based on a total weight of the silicon-based active material, and may be in a range from 4 wt % to 12 wt % in some embodiments. Within this range, the life-span properties may be improved while maintaining the capacity properties of the silicon-based active material.

For example, the carbon coating may include at least one selected from the group consisting of amorphous carbon, carbon nanotube, carbon nanofiber, graphite, graphene, graphene oxide and a reduced graphene oxide.

In some embodiments, a content of the silicon-based active material may be in a range from 0.1 wt % to 35 wt %, and may be 6 wt % to 30 wt % in some embodiments, based on a total weight of the first anode active material layer. Within this range, sudden increase of the volume expansion ratio relative to an increase of energy density of the secondary battery may be prevented. Accordingly, the life-span properties of the lithium secondary battery may be improved during repeated rapid charging and discharging.

In some embodiments, the graphite-based active material may include both artificial graphite and natural graphite.

In the case of using only artificial graphite as the anode active material, power properties may be improved, but the expansion of the silicon-based active material may not be sufficiently suppressed. As a result, the life-span properties of the secondary battery may be lowered, and an adhesive strength with the anode current collector may also be lowered to cause detachment of the anode active material layer during charging and discharging.

When only natural graphite is used as the anode active material, the adhesion to the anode current collector may be improved, but a resistance may be increased during rapid charging and discharging, thereby lowering power properties.

In some embodiments of the disclosed technology, the first anode active material layer 120 may include the silicon-based active material, artificial graphite and natural graphite. Accordingly, the adhesive strength between the anode current collector 110 and the first anode active material layer 120 and the power properties of the secondary battery may both be improved.

In some embodiments, a weight of natural graphite included in the first anode active material layer 120 may be less than or equal to a weight of artificial graphite included in the first anode active material layer 120. Accordingly, a resistance during rapid charging may be reduced, the power properties may be improved, and high rate charge/discharge properties of the secondary battery may be improved.

In some embodiments, a ratio of a weight of natural graphite included in the first anode active material layer 120 relative to a weight of artificial graphite included in the first anode active material layer 120 may be in a range from 0.025 to 1. In this case, the adhesive strength may be maintained at an interface between the anode current collector 110 and the first anode active material layer 120 while sufficiently improving the high rate charge/discharge properties. Thus, a resistance at the interface may be reduced while maintaining mechanical stability of the anode 100, so that the power properties may be improved.

For example, a first anode active material composition including the silicon-based active material and the graphite-based active material may be coated on the anode current collector 110, and then dried and pressed to form the first anode active material layer 120.

For example, the first anode active material composition may be prepared by mixing the silicon-based active material and the graphite-based active material in a solvent with an anode binder, a conductive material, and/or a dispersive agent.

The solvent may include an aqueous solvent such as water, aqueous hydrochloric acid solution or aqueous sodium hydroxide solution, or a non-aqueous solvent such as N-methyl-2-pyrrolidone (NMP), dimethylformamide, dimethylacetamide, N,N-dimethylaminopropylamine, ethylene oxide, tetrahydrofuran, etc.

For example, the anode binder may include a polymer material such as styrene-butadiene rubber (SBR). In an embodiment, a thickener such as carboxylmethyl cellulose (CMC) may also be used together with the anode binder.

The conductive material may be included to promote electron movement between active material particles. For example, the conductive material may include a carbon-based conductive material such as graphite, carbon black, graphene and carbon nanotube, and/or a metal-based conductive material such as tin, tin oxide, titanium oxide, a perovskite material including, e.g., $LaSrCoO_3$, $LaSrMnO_3$, etc.

In some example embodiments, both the silicon-based active material and the graphite-based active material may be used so that the life-span properties may be improved while implementing high-capacity properties of silicon.

In some example embodiments, a second anode active material layer 130 including a porous structure may be formed on the first anode active material layer 120.

The porous structure may include carbon-based particles including pores, and a silicon-containing coating formed at an inside of the pores of the carbon-based particles and/or on surfaces of the carbon-based particles.

For example, the anode active material may be formed to include both silicon and carbon-based particles. In this case, carbon may partially alleviate the volume expansion of silicon. However, during charging and discharging of the secondary battery, a difference between volume expansion rations of silicon (e.g., about 400% or more) and carbon (e.g., about 150% or less) may result in cracks in the anode active material. Accordingly, the anode active material may be exposed to an electrolyte during repeated charging and discharging, thereby causing side reactions such as a gas generation, and the life-span properties of the secondary battery may be deteriorated. In some embodiments of the disclosed technology, the carbon-based particles included in the porous structure may include pores. For example, the carbon-based particle may be a porous particle including a plurality of pores.

In some embodiments, the silicon-containing coating may be formed at inside the pores and/or on the surface of the carbon-based particle. Accordingly, the cracks due to the difference of the volume expansion ratio between carbon and silicon may be prevented during charging and discharging of the secondary battery.

For example, the second anode active material layer 130 may be provided as an outermost layer of the anode 100. Accordingly, the side reaction between the electrolyte and the silicon particles at an outermost periphery of the anode 100 may be suppressed, and the life-span characteristics of the secondary battery may be improved.

If the second anode active material layer 130 including the porous structure is not provided as the outermost layer of the anode 100, the side reactions between the silicon-based active material and the electrolyte in the first anode active material layer 120 may be increased. Accordingly, the life-span properties of the secondary battery may be deteriorated.

For example, the capacity and the energy density of the secondary battery may be enhanced by the second anode active material layer 130 including the porous structure that includes the silicon-containing coating. For example, even though the content of the silicon-based active material included in the first anode active material layer 120 is reduced, the capacity of the secondary battery may be increased by the porous structure included in the second anode active material layer 130 Accordingly, the capacity and the energy density of the secondary battery may be enhanced while reducing the volume expansion of the silicon-based active material in the first anode active material layer 120.

In some embodiments, a pore size of the carbon-based particles may be 20 nm or less. In some embodiments, the pore size of the carbon-based particles may be less than 10 nm. Within this range, excessive deposition of silicon in the pores may be prevented. Thus, defects due to the difference in volume expansion rations between carbon and silicon may be further alleviated during charging and discharging of the secondary battery. In some embodiments, the pore size range of the carbon-based particle may be in a range from 0.1 nm to 20 nm, or from 0.1 nm to 10 nm.

In some implementations, the term "pore size" may refer to a diameter of a pore inlet formed on the surface of the carbon-based particle.

For example, the above-mentioned carbon-based particles may include an activated carbon, a carbon nanotube, a carbon nanowire, graphene, a carbon fiber, carbon black, graphite, a porous carbon, a pyrolyzed cryogel, a pyrolyzed xerogel, a pyrolyzed aerogel, etc. The activated carbon, the carbon nanotube, the carbon nanowire, graphene, the carbon fiber, the carbon black, the graphite, the porous carbon, the pyrolyzed cryogel, the pyrolyzed xerogel, and the pyrolyzed aerogel may be used alone as the carbon-based particles or a combination of two or more of the activated carbon, the carbon nanotube, the carbon nanowire, graphene, the carbon fiber, the carbon black, the graphite, the porous carbon, the pyrolyzed cryogel, the pyrolyzed xerogel, and the pyrolyzed aerogel may be used as the carbon-based particles.

In some embodiments, the above-described carbon-based particle may have an amorphous structure or a crystalline structure. For example, the carbon-based particle may have the amorphous structure. In this case, durability of the porous structure may be increased, and crack generation may be suppressed during charging and discharging or from an external impact. Accordingly, the life-span properties of the secondary battery may be improved.

In some example embodiments, the porous structure may include the silicon-containing coating formed inside the pores of the carbon-based particle or on the surface of the carbon-based particle. The difference in volume expansion ratios between carbon and silicon may be mitigated while employing the high capacity properties of silicon included in the silicon-containing coating. Thus, micro-cracks and exposure to the electrolyte solution caused by repeatedly charging and discharging the secondary battery may be reduced, and the life-span properties of the secondary battery may be improved while maintaining the power properties.

For example, the silicon-containing coating may refer to a layer in which silicon particles are formed on at least a portion of the surface and/or inside the pores of the carbon-based particle.

In some example embodiments, the above-described silicon-containing coating may have an amorphous structure or may contain silicon having a crystallite size of 7 nm or less as measured through an X-ray diffraction (XRD) analysis. In some embodiments, the crystallite size may be 4 nm or less.

Within the above range, mechanical stability of the anode active material may be improved during a press process for manufacturing the secondary battery or during repeated charging and discharging. Accordingly, the life-span properties and the capacity retention of the secondary battery may be enhanced.

In some implementations, the term "amorphous structure" refers to a case where a shape of a single silicon included in the silicon-containing coating is amorphous, or refers to an excessively small particulate having a size which is not substantially measurable by a Scherrer equation represented by Formula 2 below in an X-ray diffraction (XRD) analysis.

$$L = \frac{0.9\lambda}{\beta\cos\theta} \quad \text{[Formula 2]}$$

In Formula 2 above, L represents a crystallite size (nm), λ represents an X-ray wavelength (nm), β represents a full width at half maximum (rad) of a corresponding peak, and θ represents a diffraction angle (rad). In some example embodiments, the full width at half maximum in the XRD analysis for measuring the crystallite size may be measured from a peak of a (111) plane of silicon included in the silicon-containing coating.

In some embodiments, a full width at half maximum (FWHM) in which a value derived from an instrument is corrected may be used as β in Formula 2 above. In an embodiment, Si may be used as a reference material to reflect the instrument-derived value. In this case, the instrument-derived FWHM may be expressed as a function of 2θ by fitting the FWHM profile in an entire 2θ range of Si. Thereafter, a value from which the instrument-derived FWHM value at the corresponding 2θ obtained from the function is corrected may be used as β.

In some embodiments, the silicon-containing coating may further contain at least one of SiOx ($0<x<2$) and silicon carbide (SIC).

In some embodiments, silicon carbide may not be formed inside the pores of the carbon-based particle or on the surface of the carbon-based particle. For example, the silicon-containing coating may not include silicon carbide. For example, the silicon-containing coating may contain only silicon and/or silicon oxide. Accordingly, the capacity properties of the secondary battery may be improved.

For example, formation of silicon carbide may be suppressed by adjusting a temperature at which a silicon deposition is performed and a time during which a silicon deposition is performed.

In some embodiments, the second anode active material layer 130 may further include artificial graphite and natural graphite.

For example, a weight of natural graphite included in the second anode active material layer 130 may be equal to or less than a weight of artificial graphite included in the second anode active material layer 130. In this case, a resistance during rapid charging may be reduced, and the power properties may be improved. Accordingly, high rate charge/discharge properties of the secondary battery may be improved.

In some embodiments, a ratio of a weight of natural graphite included in the second anode active material layer 130 to a weight of artificial graphite included in the second anode active material layer 130 may be in a range from 0.025 to 1. In this case, an adhesive strength at an interface between the first anode active material layer 120 and the second anode active material layer 130 may be maintained while sufficiently improving high rate charge/discharge properties. Accordingly, the resistance at the interface may be reduced while maintaining the mechanical stability of the anode 100, so that the power propertied may be improved.

In some embodiments, a content of the porous structure may be in a range from 0.1 wt % to 35 wt %. In some embodiments, a content of the porous structure may be in a range from 6 wt % to 30 wt % in some embodiments, based on a total weight of the second anode active material layer 130. Within the above range, the volume expansion ratio of silicon may be effectively suppressed by the pores of the carbon-based particles, and it is possible to further suppress an increase of the volume expansion ratio compared to an increase of the energy density of the secondary battery. Accordingly, the life-span properties of the lithium secondary battery may be further improved during repeated rapid charging and discharging.

In some embodiments, a thickness of the second anode active material layer 130 may be 0.5% to 50% of a total thickness of the first anode active material layer 120 and the second anode active material layer 130. Within this range, the anode 100 having high capacity and improved life-span may be implemented while sufficiently including the porous structure. In addition, reduction of the energy density due to an excessive increase of the thickness of the anode 100 may be prevented. Accordingly, the secondary battery having high capacity and high energy density may be implemented.

For example, a second anode active material composition including the porous structure may be coated on the first anode active material layer 120, and then dried and pressed to form the above-described second anode active material layer 130.

For example, the second anode active material composition may be prepared by mixing the porous structure with an anode binder, a conductive material and/or a dispersive agent in a solvent. In an embodiment, the second anode active material composition may be prepared by mixing artificial graphite and natural graphite with the porous structure, the anode binder, the conductive material and/or the dispersive agent.

For example, the solvent, the anode binder, the conductive material and the dispersive agent may include the same types of compounds as described above.

Figure 2:
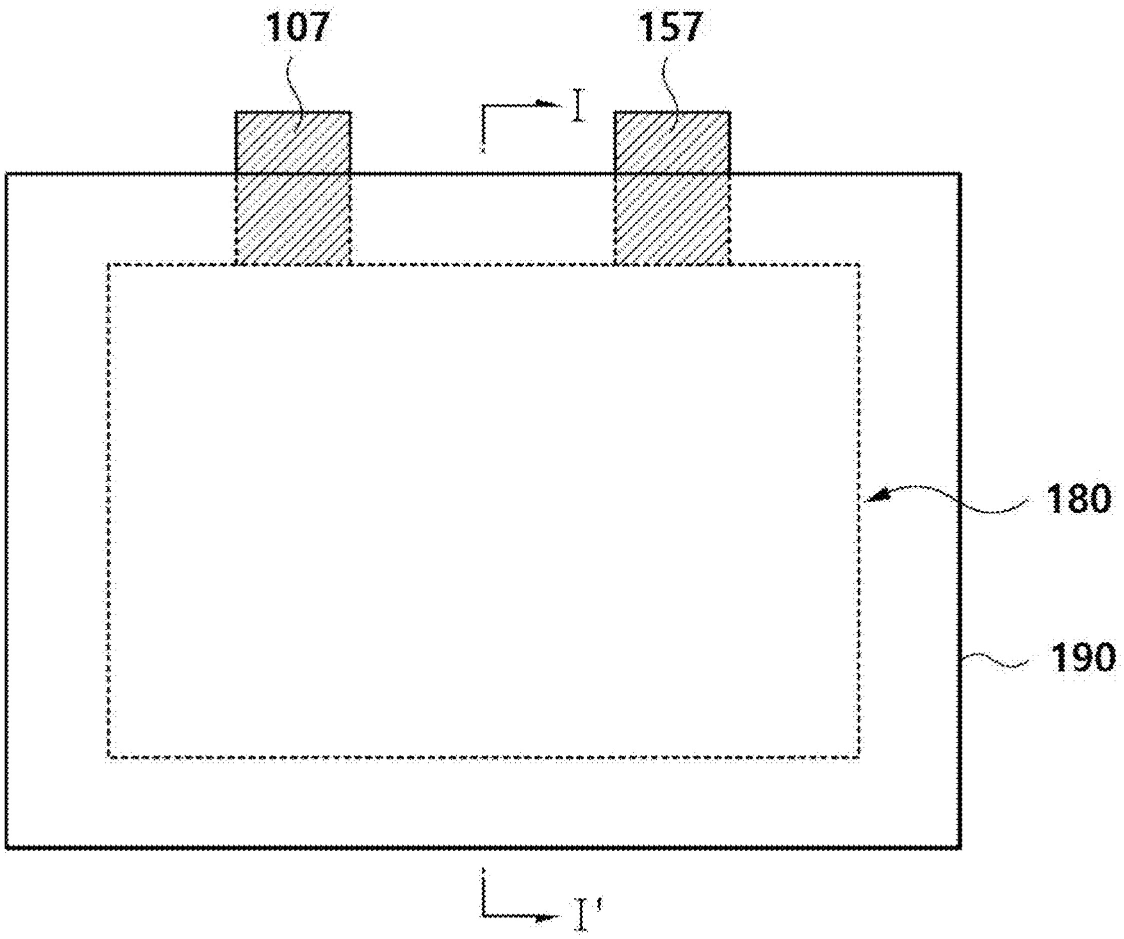
FIG. 2 is a schematic plan view illustrating a secondary battery based on some example embodiments.
Figure 3:
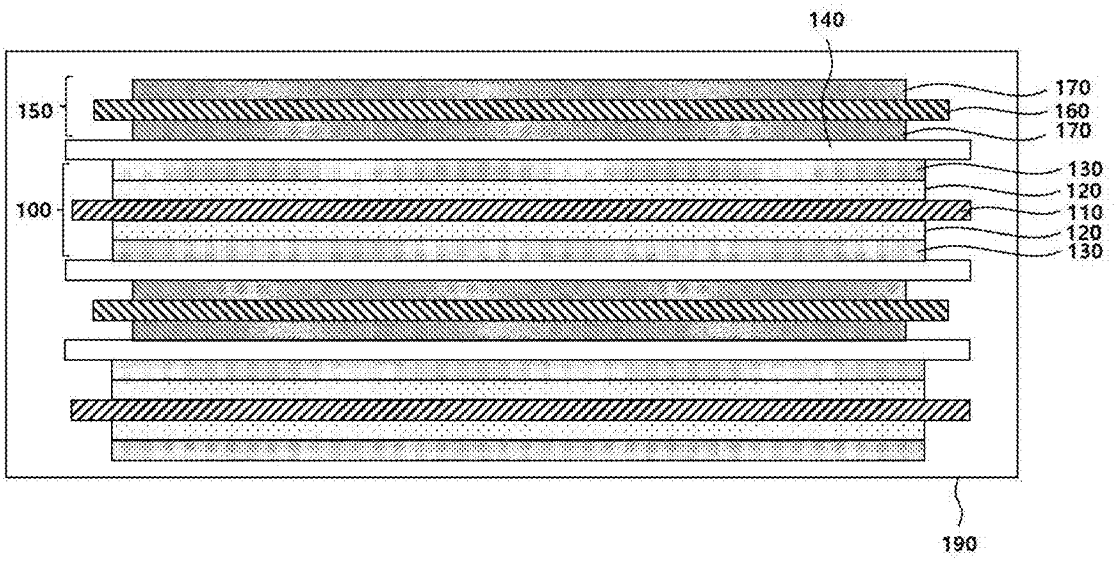
FIG. 3 is a schematic cross-sectional view illustrating a secondary battery based on some example embodiments.

FIGS. 2 and 3 are a schematic plan view and a schematic cross-sectional view illustrating a secondary battery based on exemplary embodiments. For example, FIG. 3 is a cross-sectional view taken along a line I-I' of FIG. 2 in a thickness direction.

Referring to FIGS. 2 and 3, the lithium secondary battery may include an electrode assembly 180 including the above-described anode 100 and a cathode 150 facing the anode 100. The electrode assembly 180 may be accommodated and impregnated with an electrolyte in a case 190.

The cathode 150 may include a cathode active material layer 170 formed by coating a mixture including the cathode active material on at least one surface of the cathode current collector 160.

The cathode current collector 160 may include stainless steel, nickel, aluminum, titanium, or an alloy thereof. The cathode current collector 160 may include aluminum or stainless steel surface-treated with carbon, nickel, titanium or silver. For example, a thickness of the cathode current collector 160 may be 10 μm to 50 μm.

The cathode active material may include a compound capable of reversibly intercalating and de-intercalating lithium ions.

In some example embodiments, the cathode active material may include lithium-nickel metal oxide. For example, the lithium-nickel metal oxide includes nickel (Ni) and may further include at least one of cobalt (Co) and manganese (Mn).

For example, the lithium-nickel metal oxide may include a layered structure or a crystal structure represented by Chemical Formula 1 below.

$$Li_xNi_{1-y}M_yO_{2+z} \quad \text{[Chemical Formula 1]}$$

In Chemical Formula 1, $0.9 \le x \le 1.2$, $0 \le y \le 0.7$, $-0.1 \le z \le 0.1$, and M may include at least one element selected from Na, Mg, Ca, Y, Ti, Hf, V, Nb, Ta, Cr, Mo, W, Mn, Co, Fe, Cu, Ag, Zn, B, Al, Ga, Sn and Zr.

In some embodiments, a molar ratio or a concentration (1−y) of Ni in Chemical Formula 1 may be greater than or equal to 0.8, and may exceed 0.8 in some embodiments.

The chemical structure represented by Chemical Formula 1 indicates a bonding relationship included in the layered structure or the crystal structure of the cathode active material, and is not intended to exclude another additional element. For example, M includes Co and/or Mn, and Co and/or Mn may serve as main active elements of the cathode active material together with Ni. Chemical Formula 1 is provided to express the bonding relationship of the main active elements, and is to be understood as a formula encompassing introduction and substitution of the additional element.

In an embodiment, an auxiliary element for enhancing chemical stability of the cathode active material or the layered structure/crystal structure may be further included in addition to the main active element. The auxiliary element may be incorporated into the layered structure/crystal structure to form a bond, and it is to be understood that this case is also included within the chemical structure represented by Chemical Formula 1.

The auxiliary element may include at least one of, e.g., Na, Mg, Ca, Y, Ti, Hf, V, Nb, Ta, Cr, Mo, W, Fe, Cu, Ag, Zn, B, Al, Ga, C, Si, Sn, Sr, Ba, Ra, P and Zr. The auxiliary element may act as an auxiliary active element such as Al which may contribute to capacity/power activity of the cathode active material together with Co or Mn.

For example, the cathode active material or the lithium-nickel metal oxide may have a layered structure or a crystal structure represented by Chemical Formula 1-1 below.

$$Li_xNi_aM1_{b1}M2_{b2}O_{2+z} \quad \text{[Chemical Formula 1-1]}$$

In Chemical Formula 1-1, M1 may include Co and/or Mn. M2 may include the above-described auxiliary element. In Chemical Formula 1-1, $0.9 \le x \le 1.2$, $0.6 \le a \le 0.99$, $0.01 \le b1+b2 \le 0.4$, and $-0.5 \le z \le 0.1$.

The cathode active material may further include a coating element or a doping element. For example, an element substantially the same as or similar to the above-mentioned auxiliary element may be used as the coating element or the doping element. For example, one of the above elements or a combination of two or more therefrom may be used as the coating element or the doping element.

The coating element or the doping element may be present on a surface of the lithium-nickel metal oxide particle or may penetrate through the surface of the lithium-nickel metal oxide particle and be included in the bonding structure represented by Chemical Formula 1 or Chemical Formula 1-1.

The cathode active material may include a nickel-cobalt-manganese (NCM)-based lithium oxide. In this case, an NCM-based lithium oxide having an increased nickel content may be used.

Ni may serve as a transition metal related to power and capacity of a lithium secondary battery. Therefore, as described above, a high-Ni composition may be employed for the cathode active material, so that a high-capacity cathode and a high-capacity lithium secondary battery may be implemented.

However, as the content of Ni increases, long-term storage stability and life-span stability of the cathode or the secondary battery may be relatively deteriorated, and side reactions with the electrolyte may be also increased. However, in some example embodiments, life-span stability and capacity retention may be improved by Mn while maintaining electrical conductivity by the inclusion of Co.

A Ni content (e.g., A mole fraction of nickel among total moles of nickel, cobalt and manganese) in the NCM-based lithium oxide may be 0.6 or more, 0.7 or more, or 0.8 or more. In some embodiments, the Ni content may be from 0.8 to 0.95, from 0.82 to 0.95, from 0.83 to 0.95, from 0.84 to 0.95, from 0.85 to 0.95, or from 0.88 to 0.95.

In some embodiments, the cathode active material may include a lithium cobalt oxide-based active material, a lithium manganese oxide-based active material, a lithium nickel oxide-based active material, or a lithium iron phosphate (LFP) active material (e.g., $LiFePO_4$).

In some embodiments, the cathode active material may include a Li-rich layered oxide (LLO)/an over lithiated oxide (OLO)-based active material, a Mn-rich-based active material, a Co-less active materials, etc., having, e.g., a chemical structure or a crystal structure represented by Chemical Formula 2. The Li-rich layered oxide (LLO)/the over lithiated oxide (OLO)-based active material, the Mn-rich-based active material, and the Co-less active materials may be used alone as the cathode active material or a combination of two or more of the Li-rich layered oxide (LLO)/the over lithiated oxide (OLO)-based active material, the Mn-rich-based active material, and the Co-less active materials may be used as the cathode active material.

$$p[Li_2MnO_3]\cdot(1-p)[Li_qJO_2] \quad \text{[Chemical Formula 1-1]}$$

In Chemical Formula 2, $0<p<1$, $0.9 \le q \le 1.2$, and J includes at least one element selected from Mn, Ni, Co, Fe, Cr, V, Cu, Zn, Ti, Al, Mg and B.

A mixture may be prepared by mixing and stirring the cathode active material in a solvent with a cathode binder, a conductive material and/or a dispersive agent. The mixture may be coated on the cathode current collector 160, and then dried and pressed to form the cathode active material layer 150.

The solvent may include N-methyl-2-pyrrolidone (NMP), dimethylformamide, dimethylacetamide, N,N-dimethylaminopropylamine, ethylene oxide, tetrahydrofuran, etc.

For example, the cathode binder may include an organic based binder such as polyvinylidenefluoride (PVDF), a vinylidene fluoride-hexafluoropropylene copolymer (PVDF-co-HFP), polyacrylonitrile, polymethylmethacrylate, etc., or an aqueous binder such as styrene-butadiene rubber (SBR) that may be used together with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may include substantially the same type of compound as that used in the formation of the first anode active material layer 120.

The anode 100 may be formed as described above.

A separator 140 may be interposed between the anode 150 and the cathode 100. The separator 140 may include a porous polymer film formed of a polyolefin-based polymer such as an ethylene homopolymer, a propylene homopolymer, an ethylene/butene copolymer, an ethylene/hexene copolymer, or an ethylene/methacrylate copolymer. The separator 140 may include a nonwoven fabric formed of a high melting point glass fiber, a polyethylene terephthalate fiber, etc.

In some embodiments, the anode 100 may have larger area (e.g., a contact area with the separator 140) and/or volume than those of the cathode 150. Accordingly, transfer of lithium ions generated from the cathode 150 may be facilitated to the anode 100 without, e.g., being precipitated. Accordingly, the effect of capacity and output improvement according to the above-mentioned anode active material may be more easily implemented.

In some example embodiments, an electrode cell may be defined by the cathode 150, the anode 100 and the separator 140, and a plurality of the electrode cells may be stacked to form an electrode assembly 180 having, e.g., a jellyroll shape. For example, the electrode assembly 180 may be formed by winding, stacking, z-folding and stack-folding of the separator 140.

The electrode assembly 150 may be accommodated in a case 190 together with an electrolyte to define a lithium secondary battery. In some example embodiments, a non-aqueous electrolyte may be used as the electrolyte.

The non-aqueous electrolyte may include a lithium salt and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N$ $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3F_2SO_2N^-)$, etc.

The organic solvent may include, e.g., propylene carbonate (PC), ethylene carbonate (EC), butylene carbonate, diethyl carbonate (DEC), dimethyl carbonate (DMC), ethylmethyl carbonate (EMC), methylpropyl carbonate, ethylpropyl carbonate, dipropyl carbonate, vinylene carbonate, methyl acetate (MA), ethyl acetate (EA), n-propylacetate (n-PA), 1,1-dimethyl ethyl acetate (DMEA), methyl propionate (MP), ethylpropionate (EP), fluoroethyl acetate (FEA), difluoroethyl acetate (DFEA), trifluoroethyl acetate (TFEA), dibutyl ether, tetraethylene glycol dimethyl ether (TEGDME), diethylene glycol dimethyl ether (DEGDME), dimethoxyethane, tetrahydrofuran (THF), 2-methyltetrahydrofuran, ethyl alcohol, isopropyl alcohol, dimethylsulfoxide, acetonitrile, dimethoxyethane, diethoxyethane, sulfolane, gamma-butyrolactone, propylene sulfite, etc. These may be used alone or in a combination thereof.

The non-aqueous electrolyte may further include an additive. The additive may include, e.g., a cyclic carbonate-based compound, a fluorine-substituted carbonate-based compound, a sultone-based compound, a cyclic sulfate-based compound, a cyclic sulfite-based compound, a phosphate-based compound, a borate-based compound, etc. These may be used alone or in a combination thereof.

The cyclic carbonate-based compound may include vinylene carbonate (VC), vinyl ethylene carbonate (VEC), etc.

The fluorine-substituted cyclic carbonate-based compound may include fluoroethylene carbonate (FEC), etc.

The sultone-based compound may include 1,3-propane sultone, 1,3-propene sultone, 1,4-butane sultone, etc.

The cyclic sulfate-based compound may include 1,2-ethylene sulfate, 1,2-propylene sulfate, etc.

The cyclic sulfite-based compound may include ethylene sulfite, butylene sulfite, etc.

The phosphate-based compound may include lithium difluoro bis-oxalato phosphate, lithium difluoro phosphate, etc.

The borate-based compound may include lithium bis (oxalate) borate, etc.

In some embodiments, a solid electrolyte may be used instead of the above-mentioned non-aqueous electrolyte. In this case, the lithium secondary battery may be manufactured in the form of an all-solid-state battery. Additionally, a solid electrolyte layer may be disposed between the cathode 150 and the anode 100 instead of the above-described separator 140.

The solid electrolyte may include a sulfide-based electrolyte. Non-limiting examples of the sulfide-based electrolyte may include $Li_2S—P_2S_5$, $Li_2S—P_2S_5—LiCl$, $Li_2S—P_2S_5—LiBr$, $Li_2S—P_2S_5—LiCl—LiBr$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (m and n are positive numbers, and Z represents Ge, Zn pr Ga), $Li_2S—GeS_2$, $Li_2S—SiS_2—Li_3PO_4$, $Li_2S—SiS_2—Li_pMO_q$, (p and q are positive numbers, M represents P, Si, Ge, B, Al, Ga or In), $Li_{7-x}PS_{6-x}Cl_x$ ($0\leq x\leq 2$), $Li_{7-x}PS_{6-z}Br_x$ ($0\leq x\leq 2$), $Li_{7-x}PS_{6-x}I_x$ ($0\leq x\leq 2$), etc. These may be used alone in a combination thereof.

In an embodiment, the solid electrolyte may include, e.g., an oxide-based amorphous solid electrolyte such as $Li_2O—B_2O_3—P_2O_5$, $Li_2O—SiO_2$, $Li_2O—B_2O_3$, $Li_2O—B_2O_3—ZnO$, etc.

As illustrated in FIG. 3, electrode tabs (a cathode tab and an anode tab) may protrude from the cathode current collector 160 and the anode electrode current collector 110 included in each electrode cell to one side of the case 190. The electrode tabs may be welded together with the one side of the case 190 to form an electrode lead (a cathode lead 157 and an anode lead 107) extending or exposed to an outside of the case 190.

The lithium secondary battery may be manufactured in, e.g., a cylindrical shape using a can, a square shape, a pouch shape or a coin shape.

Experimental examples discussed below show some embodiments of the disclosed technology.

Fabrication of Anode and Secondary Battery

Example 1

(1) Formation of First Anode Active Material Layer

1) Preparation of Silicon-Based Active Material

A mixture of silicon (Si), silicon dioxide ($SiO_2$) and magnesium (Mg) was put into a reaction furnace and fired at a temperature of 600° C. for 5 hours under a vacuum atmosphere of 10 Pa.

The fired mixture was cooled, and a precipitate was taken out and pulverized and classified with a ball mill to obtain a plurality of Mg-doped SiO particles. An input amount of Mg was adjusted to be 12 wt % based on a total weight of a silicon-based active material.

Input amounts of silicon and silicon dioxide among raw materials were adjusted so that a ratio (Si/Mg) of a content of a silicon element to the total weight of the silicon-based active material particles relative to a content of a magnesium element to the total weight of the silicon-based active material particles was in a range from 2 to 12.

A plurality of obtained Mg-doped SiO particles were placed in a CVD coater, and a mixed gas of a methane gas and an argon gas was injected at a flow rate of 50 mL/min to 100 mL/min. A temperature of the CVD coater was increased to about 400° C. to 800° C. at a ramping rate of 5° C./min to 20° C./min, and maintained for about 60 minutes to 360 minutes to form a carbon coating.

A plurality of SiO particles each having the carbon coating and being doped with Mg were used as a silicon-based active material.

2) Preparation of First Anode Active Material Layer 96.4 wt % of an anode active material including artificial graphite (D50: 20 μm) and the prepared silicon-based active material in a weight ratio of 8:2, 0.1 wt % of an SWCNT conductive material, and 3.5 wt % of CMC/SBR (binder, 1.5/2.0 weight ratio) were mixed in water to prepare a first anode active material composition in the form of a slurry.

The first anode active material composition was coated, dried and pressed on one surface of a copper current collector (copper foil having a thickness of 8 μm) to form a first anode active material layer.

(2) Formation of Second Anode Active Material Layer

1) Preparation of Porous Structure

Formation of Carbon-Based Particles i) Synthesis of resol oligomer: Phenol and formaldehyde were mixed in a molar ratio of 1:2, and 1.5 wt % of triethylamine was added thereto, followed by a reaction under conditions of 85° C., 4 hours and 160 rpm (stirring).

ii) Suspension stabilization of resol oligomer: 1 g of PVA was dispersed in a water-dispersible medium, and then added to the resol oligomer.

iii) Curing of resol oligomer: 3g of HMTA as a curing agent was added and reacted under conditions of 98° C. for 12 hours at 400 rpm (stirring).

iv) Obtaining carbon material: The cured resol oligomer was classified using a sieve, and then washed with $H_2O$.

v) Unreacted monomers and oligomers were removed from the washed resol oligomer using ethanol, and then dried.

vi) Carbonization and activation: The dried resol oligomer was calcined at 900° C. for 1 hour under a nitrogen atmosphere. During the firing, CO2 gas was introduced at a flow rate of 1 L/min and carbonized at 900° C.

Formation of Silicon-Containing Coating

A silane gas was injected into the CVD coater at a flow rate of 50 mL/min to 100 mL/min, a temperature was increase to 400° C. or more and less than 600° C. at a ramping rate of 5° C./min to 20° C./min, and then maintained for about 120 minutes to 240 minutes to obtain a porous structure in which a silicon-containing coating was formed at an inside and on a surface of pores of the carbon-based particles.

2) Preparation of Second Anode Active Material Layer 90.4 wt % of a graphite-based active material in which artificial graphite and natural graphite were mixed in 5:5 weight ratio, 6.0 wt % of the prepared porous structure, 0.1 wt % of an SWCNT conductive material, and 3.5 wt % of CMC/SBR (binder, 1.5/2.0 weight ratio) were mixed in water to form a second anode active material composition in the form of a slurry.

(3) Fabrication of Half Cell

An electrolyte solution was injected into an electrode assembly including the above-prepared anode, a counter electrode (lithium metal) and a PE separator interposed between the anode and the counter electrode to assemble a coin cell (CR2032). The assembled coin cell was left at room temperature for 3 to 24 hours to prepare a half cell. As the electrolyte solution, a 1.0M $LiPF_6$ solution in a mixed organic solvent (EC:FEC:EMC/DEC=2:1:2:5 volume %) was used.

(4) Fabrication of Lithium Secondary Battery

A slurry was prepared by mixing $Li[Ni_{0.88}Co_{0.1}Mn_{0.02}]O_2$ as a cathode active material, carbon black as a conductive material, and polyvinylidene fluoride (PVDF) as a binder in a weight ratio of 96.5:2:1.5. The slurry was uniformly coated on an aluminum foil having a thickness of 12 μm, and vacuum dried to prepare a cathode for a secondary battery.

The cathode and the anode prepared as described above were each notched by a predetermined size, and stacked with a separator (polyethylene, thickness: 13 μm) interposed therebetween to form an electrode cell. Each tab portion of the cathode and the anode was welded. The welded cathode/separator/anode assembly was inserted in a pouch, and three sides of the pouch except for an electrolyte injection side were sealed. The tab portions were also included in sealed portions.

An electrolyte was injected through the electrolyte injection side, and then the electrolyte injection side was also sealed. Subsequently, the above structure was impregnated for more than 12 hours.

In the preparation of the electrolyte, a 1M $LiPF_6$ solution was prepared using a mixed solvent of EC/EMC (25/75; volume ratio), and 8 wt % of fluoroethylene carbonate (FEC), 0.5 wt % of 1,3-propensultone (PRS) and 1.0 wt % of 1,3-propanesultone (PS) were added to the solution.

Thereafter, a heat press pre-charging was performed for 60 minutes with a current corresponding to 0.5C. Degassing was performed after a stabilization of 12 hours or more, and then aging for more than 24 hours and a formation charge/discharge were performed (charge condition CC—CV 0.25C 4.2V 0.05C CUT-OFF, discharge condition CC 0.25C 2.5V CUT-OFF).

Thereafter, a standard charge and discharge was performed (charge condition CC—CV 0.33 C 4.2V 0.05C CUT-OFF, discharge condition CC 0.33C 2.5V CUT-OFF).

Example 2

An anode and a lithium secondary battery were manufactured by the same method as that in Example 1, except that magnesium was added in an amount corresponding to 5 wt % based on the total weight of the silicon-based active material.

Example 3

An anode and a lithium secondary battery were manufactured by the same method as that in Example 1, except that magnesium was added in an amount corresponding to 18 wt % based on the total weight of the silicon-based active material.

Example 4

An anode and a lithium secondary battery were manufactured by the same method as that in Example 1, except that magnesium was added in an amount corresponding to 15 wt % based on the total weight of the silicon-based active material.

Comparative Example 1

An anode and a lithium secondary battery were manufactured by the same method as that in Example 1, except that the second anode active material layer was not formed.

Comparative Example 2

An anode and a lithium secondary battery were manufactured by the same method as that in Example 1, except that the same amount of a silicon-based active material (the same as the silicon-based active material included in the first anode active material layer) was added to the second anode active material layer instead of the porous structure.

Comparative Example 3

An anode and a lithium secondary battery were manufactured by the same method as that in Example 1, except that the same amount of silicon oxide (SiOx, 0<x<2, D50: 5 μm) (Mg undoped) was added to the second anode active material layer instead of the porous structure.

Comparative Example 4

81.4 wt % of a graphite-based active material in which artificial graphite and natural graphite were mixed in a weight ratio of 5:5, 15.0 wt % of the silicon-based active material of Example 1, 0.1 wt % of an SWCNT conductive material, and 3.5 wt % of CMC/SBR (binder, 1.5/2.0 weight ratio) were mixed in water to form a first anode active material composition.

96.4 wt % of a graphite-based active material in which artificial graphite and natural graphite were mixed in a weight ratio of 5:5, 0.1 wt % of an SWCNT conductive material, and 3.5 wt % of CMC/SBR (binder, 1.5/2.0 weight ratio) were mixed in water to form a second anode active material composition.

An anode and a lithium secondary battery were manufactured by the same method as that in Example 1, except for the above-described details.

Comparative Example 5

An anode and a lithium secondary battery were manufactured by the same method as that in Example 1, except that the same amount of silicon oxide (SiOx, 0<x<2, D50: 5 μm) (Mg undoped) was added to the first anode active material layer instead of the silicon-based active material of Example 1.

Comparative Example 6

An anode and a lithium secondary battery were manufactured by the same method as that in Comparative Example 5, except that the same amount of silicon oxide (SiOx, 0<x<2, D50: 5 μm) (Mg undoped) was added to the second anode active material layer instead of the porous structure.

Evaluation Example 1

(1) Peak Area Ratio in Mg1s Spectrum of Surface of Silicon-Based Active Material A 1303 eV peak area and a 1304.5 eV peak area appearing in a Mg1s spectrum were measured from an XPS measurement for the first anode active material layers prepared in Examples 1 to 4 and Comparative Examples 1 to 6.

The peak areas were substituted into Formula 1 as shown in Table 1.

(2) Evaluation on Volume Expansion Ratio and Detachment of Anode

After charging (CC/CV 0.1C 0.01V (vs. Li) 0.01C CUT-OFF) the half cells prepared in Examples 1 to 4 and Comparative Examples 1 to 6 at room temperature (25° C.), the coin cells were disassembled.

A thickness (SOCO, t1) of the anode without being charged and a thickness (SOC100, t2) of the charged anode were measured, and an expansion ratio of the anode was calculated through Equation below. The calculated expansion ratios are shown in Table 2 below.

$$\text{Expansion ratio }(\%)=(t2-t1)/(t1-\text{current collector thickness})\times 100 \quad \text{[Equation]}$$

In Equation above, the current collector thickness is a thickness of the anode current collector used in the fabrication of the anode of the secondary battery.

Further, the charged anode was left at room temperature (25° C.)for 10 minutes without an additional washing process, and a state of the adhesive surface between the anode current collector and the first anode active material layer was visually checked to evaluate a detachment as follows.

O: Detachment was detected.

X: No detachment detected.

(3) Evaluation on Power Properties

The lithium secondary batteries prepared in Examples 1 to 4 and Comparative Examples 1 to 6 were charged at room temperature (CC/CV 0.1C 0.01V (vs. Li) 0.01C CUT-OFF) and discharged (CC 0.1C 1.5V (vs. Li). DCIR (m(Ω) and power (W/kg) during charging and discharging were measured and shown in Table 2 below.

For the lithium secondary batteries prepared in Examples 1 to 4 and Comparative Examples 1 to 4, charge (CC/CV 0.3C 4.2V 0.05C CUT-OFF) and discharge (CC 0.3C 2.5V CUT-OFF) were performed at room temperature (25° C.) twice. Thereafter, each battery was discharged (CC 0.3C) from the charged state (CC/CV 0.3C 4.2V 0.05C CUT-OFF) to an SOC50 point, and a 10 seconds DCIR (m(2) and a power (W/kg) at the SOC50 point were measured and shown in Table 2 below.

(4) Evaluation of Rapid Charge Life-Span Property

The lithium secondary batteries prepared according to Examples 1 to 4 and Comparative Examples 1 to 6 were charged to reach a DOD72 state within 25 minutes according to a step charging method by C-rates of 3.25 C/3.0 C/2.75

C/2.5 C/2.25 C/2.0 C/1.75 C/1.5 C/1.25 C/1.0 C/0.7 C/0.5 C, and discharged by 1/3C. The rapid charging evaluation was performed while repeating the charging and discharging cycle as one cycle. After repeating 100/200/300/400/500 cycles with an interphase of 10 minutes between the charge and discharge cycles, a rapid charge capacity retention was measured and shown in Table 3 below.

TABLE 1

| No. | Mg content (wt %) | peak area ratio of Mg1s spectrum |
|---|---|---|
| Example 1 | 12 | 0.35 |
| Example 2 | 5 | 0.10 |
| Example 3 | 18 | 0.58 |
| Example 4 | 15 | 0.68 |
| Comparative Example 1 | 12 | 0.34 |
| Comparative Example 2 | 12 | 0.36 |
| Comparative Example 3 | 12 | 0.40 |
| Comparative Example 4 | 12 | 0.31 |
| Comparative Example 5 | — | — |
| Comparative Example 6 | — | — |

TABLE 2

| No. | volume expansion ratio (%) | detachment | discharge DCIR (mΩ) | charge DCIR (mΩ) | discharge power (W/kg) | charge power (W/kg) |
|---|---|---|---|---|---|---|
| Example 1 | 22.0 | X | 1.10 | 1.12 | 3128.85 | 2534.61 |
| Example 2 | 25.1 | X | 1.09 | 1.11 | 3215.41 | 2624.17 |
| Example 3 | 19.5 | X | 1.14 | 1.16 | 3011.25 | 2441.64 |
| Example 4 | 21.3 | X | 1.10 | 1.11 | 3098.94 | 2520.04 |
| Comparative Example 1 | 29.1 | X | 1.21 | 1.22 | 2803.92 | 2233.94 |
| Comparative Example 2 | 28.1 | X | 1.11 | 1.13 | 3091.42 | 2434.91 |
| Comparative Example 3 | 31.2 | X | 1.21 | 1.24 | 2770.79 | 2129.55 |
| Comparative Example 4 | 27.2 | ○ | 1.12 | 1.14 | 3060.50 | 2410.56 |
| Comparative Example 5 | 28.5 | X | 1.11 | 1.12 | 3085.15 | 2611.78 |
| Comparative Example 6 | 33.0 | ○ | 1.27 | 1.28 | 2599.62 | 2165.11 |

TABLE 3

| No. | rapid charge cycle discharge capacity retention (%) | | | | |
|---|---|---|---|---|---|
| | 100 cycles | 200 cycles | 300 cycles | 400 cycles | 500 cycles |
| Example 1 | 98.30 | 97.43 | 96.76 | 95.95 | 95.33 |
| Example 2 | 97.51 | 96.64 | 95.84 | 95.07 | 94.59 |
| Example 3 | 98.61 | 97.85 | 96.91 | 96.10 | 95.51 |
| Example 4 | 98.49 | 97.80 | 96.85 | 96.01 | 95.46 |
| Comparative Example 1 | 93.72 | 92.22 | 91.35 | 90.77 | 90.45 |
| Comparative Example 2 | 96.58 | 94.24 | 93.08 | 92.19 | 91.46 |
| Comparative Example 3 | 94.75 | 91.35 | 89.40 | 57.75 | 86.31 |

TABLE 3-continued

| No. | rapid charge cycle discharge capacity retention (%) | | | | |
|---|---|---|---|---|---|
| | 100 cycles | 200 cycles | 300 cycles | 400 cycles | 500 cycles |
| Comparative Example 4 | 91.91 | 90.08 | 89.05 | 88.10 | 87.55 |
| Comparative Example 5 | 92.11 | 91.05 | 89.10 | 88.02 | 87.33 |
| Comparative Example 6 | 89.25 | 88.06 | 86.98 | 85.94 | 85.03 |

Referring to Tables 1 to 3, in Examples 1 to 4 including the first anode active material layer containing the silicon-based active material doped with magnesium and the second anode active material layer containing the porous structure, the resistance was reduced, and the power properties and capacity retention were improved compared to those from Comparative Examples 1 to.

In Examples 1 to 4, the power and life-span properties were improved compared to those from Comparative Examples 1 to 4 and 6 where the silicon-based active material was directly exposed to the electrolyte.

In Example 2 where the doping content of magnesium was less than 7 wt % based on the total weight of the silicon-based active material, the cycle property was relatively lowered.

In Example 3 where the doping content of magnesium exceeded 17 wt % based on the total weight of the silicon-based active material, the resistance was relatively increased.

In Example 4 where the peak area ratio according to Formula 1 exceeded 0.6, the power properties were relatively lowered.

[Evaluation Example 2] Evaluation on Charging Properties by Rate and Rapid Charge Life-Span According to Weight Ratio of Natural Graphite to Artificial Graphite

(1) Examples 5 and 6

An anode and a lithium secondary battery were prepared by the same method as that in Example 1, except that a weight ratio of natural graphite to a total weight of artificial graphite in the first anode active material layer and the second anode active material layer was modified as shown in Table 4 below.

(2) Evaluation Method

1) Evaluation on Rapid Charge Life-Span Properties

Rapid charge life-span properties of the lithium secondary batteries according to Examples 1, 5 and 6 after 100/200/300 cycles were evaluated by the same method as that (4) of Evaluation Example 1, and the results are shown in Table 4 below.

2) Evaluation on Charging Properties by Rate

The lithium secondary batteries manufactured according to Examples 1, 5 and 6 were charged (a first charge) (CC/CV 0.2C 4.2V 0.05C CUT-OFF) and discharged (CC 0.2C 2.5V CUT-OFF), and then a second charge (CC/CV xC 4.2V 0.05C CUT-OFF) was performed.

In the second charge, x was 0.2C, 0.333C, 0.5C, 1.0C, 1.5C, 2.0C, 2.5C and 3.0C, and the second charge was carried out in a chamber maintained at a constant temperature (25° C.).

A constant current section charge capacity (%) for each charging rate for the initial 0.2C constant current charge capacity was measured, and the results are shown in Table 5 below.

TABLE 4

| No. | weight ratio of natural graphite to artificial graphite: first anode active material layer | weight ratio of natural graphite to artificial graphite: second anode active material layer | rapid charge cycle capacity retention (%): 100 cycles | 200 cycles | 300 cycles |
|---|---|---|---|---|---|
| Example 1 | 1 | 1 | 98.30 | 97.43 | 96.76 |
| Example 5 | 1.5 | 1 | 97.31 | 96.89 | 95.93 |
| Example 6 | 1 | 1.5 | 97.05 | 96.25 | 95.42 |

TABLE 5

| No. | constant current charge section capacity: 0.2C | 0.333C | 0.5C | 1.0C | 1.5C | 2.0C | 2.5C | 3.0C |
|---|---|---|---|---|---|---|---|---|
| Example 1 | 100.0 | 97.2 | 91.1 | 82.5 | 77.3 | 71.0 | 66.1 | 60.9 |
| Example 5 | 100.0 | 96.5 | 89.1 | 81.3 | 76.1 | 67.8 | 61.2 | 56.3 |
| Example 6 | 100.0 | 96.6 | 89.3 | 81.5 | 76.2 | 68.0 | 61.5 | 56.7 |

Referring to Tables 4 and 5, in Examples 5 and 6 where the amount of natural graphite was greater than the amount of artificial graphite in the first anode active material layer or the second anode active material layer, high-rate charging properties were relatively lowered.

[Evaluation Example 3] Evaluation on Battery Properties According to Thickness Ratio of First Anode Active Material Layer and Second Anode Active Material Layer (1) Examples 7 to 10

An anode and a lithium secondary battery were manufactured by the same method as that in Example 1, except that a thickness ratio of the second anode active material layer based on a total thickness of the first anode active material layer and the second anode active material layer was modified as shown in Table 6 below.

(2) Evaluation Method

1) Evaluation on Energy Density

The lithium secondary batteries prepared in Examples 1 and 7 to 10 were charged (CC/CV 0.3C 4.2V 0.05C CUT-OFF) and discharged (CC 0.3C 2.5V CUT-OFF) to obtain a discharge capacity (Ah) and an energy (Wh).

A volume-energy density was calculated by measuring a volume of each battery in a 4.2V-charged state, and the results are shown in Table 6 below.

2) Evaluation on Rapid Charge Life-Span Properties

The rapid charge life-span properties of the secondary batteries according to Examples 1 and 7 to 10 after 100 cycles were evaluated by the same method as that in (4) of Evaluation Example 1, and the results are shown in Table 6.

TABLE 6

| No. | thickness of second anode active material layer (%) | volume-energy density (Wh/L) | rapid charge capacity retention (100 cycles, %) |
|---|---|---|---|
| Example 1 | 50 | 715 | 98.30 |
| Example 7 | 10 | 717 | 98.26 |
| Example 8 | 30 | 716 | 98.22 |
| Example 9 | 0.3 | 720 | 97.12 |
| Example 10 | 55 | 703 | 98.43 |

Referring to Table 6, in Examples 1, 7 and 8 where the thickness ratio of the second anode active material layer was within a range from 0.5% to 50% based on the total thickness of the anode active material layer, side reactions with the electrolyte were suppressed and the life-span properties were improved while improving the energy density.

In Example 9 where the thickness ratio of the second anode active material layer was less than 0.5%, the capacity retention rate was relatively lowered.

In Example 10 where the thickness ratio of the second anode active material layer exceeded 50%, the energy density was relatively lowered.

[Evaluation Example 4] Evaluation on Battery Properties According to Content of Silicon-Based Active Material (1) Examples 11 to 15

An anode, a half cell and a lithium secondary battery were prepared by the same method as that in Example 1, except that a content of the silicon-based active material included in the first anode active material layer based on the total weight of the first anode active material layer was modified as shown in Table 7 below.

(2) Evaluation Method

1) Evaluation on Volume Expansion Ratio

An anode volume expansion ratio was measured for each anode electrodes prepared in Examples 1 and Examples 11 to 15 by the same method as that in (2) of Evaluation Example 1, and the results are shown in Table 7.

2) Evaluation on Energy Density

Energy densities of the lithium secondary batteries prepared in Examples 1 and Examples 11 to 15 were measured by the same manner as that in (2) 1) of Evaluation Example 3, and the results are shown in Table 7.

3) Evaluation on Rapid Charge Life-Span Properties

Rapid charge life-span properties of the lithium secondary batteries according to Examples 1 and Examples 11 to 15 after 100 cycles were evaluated by the same manner as that in (4) of Evaluation Example 1, as shown in Table 7.

4) Evaluation on Normal Charge Life-Span Properties

Normal charge life-span properties of the lithium secondary batteries prepared in Examples 1 and Examples 11 to 15 were evaluated in a range of DOD94 (SOC2-96) in a chamber maintained at 35° C. Under constant current/constant voltage (CC/CV) conditions, each battery was charged by 0.3C to a voltage corresponding to SOC96, and then cut off by 0.05C. Thereafter, the battery was discharged by 0.3C to a voltage corresponding to SOC2 under a constant current (CC) condition, and a discharge capacity was measured. The above process was repeated for 500 cycles, and a discharge capacity retention was evaluated as the normal charge life-span property. The results are shown in Table 7 below.

tures having pore sizes and crystallite sizes were obtained as shown in Table 9 in the preparation of the porous structure.

(2) Evaluation Method

1) Measurement of Pore Size of Carbon-Based Particles

The pore sizes of the carbon-based particles prepared according to Examples 1, 16 and 17 were measured using a Micromeritics Surface area analyzer (ASAP-2420). Specifically, positions of a maximum peak in a Barrett-Joyner-Halenda (BJH) pore size distribution curve obtained from a nitrogen gas sorption isotherm curve of samples from Examples 1, 16 and 17 was measured to determine the carbon-based The pore size of the particles were measured to measure the pore sizes.

2) Determination of Amorphousness and Crystallite Size of Silicon Particles Included in Silicon-Containing Coating.

The crystallite sizes of the porous structures prepared according to Examples 1, 16 and 17 were calculated using an XRD analysis and Formula 1 as described above.

When the silicon particle size was excessively small and could not be practically measurable through the XRD analysis, silicon included in the silicon-containing coating was determined as amorphous.

TABLE 7

| No. | content of silicon-based active material (wt %) | volume expansion ratio (%) | volume-energy density (Wh/L) | rapid charge capacity retention (100 cycles, %) | normal charge life-span capacity retention (500 cycles, %) |
|---|---|---|---|---|---|
| Example 1 | 9.0 | 22.0 | 715 | 98.30 | 93.3 |
| Example 11 | 6.0 | 20.8 | 705 | 98.55 | 93.1 |
| Example 12 | 30.0 | 31.1 | 733 | 97.67 | 92.6 |
| Example 13 | 35.0 | 33.4 | 738 | 97.39 | 92.5 |
| Example 14 | 40.0 | 43.7 | 740 | 94.61 | 92.0 |
| Example 15 | 0.05 | 12.9 | 693 | 98.55 | 93.6 |

Referring to Table 7, in Examples 1 and 11 to 13, the volume expansion ratio, the energy density and the capacity retention were improved. As the content of the silicon-based active material increased, the volume expansion ratio and the energy density were increased, and the capacity retention was decreased.

In Example 14 where the content of the silicon-based active material exceeded 35 wt %, the volume expansion ratio was relatively increased, and the capacity retention was relatively lowered.

In Example 15 where the content of the silicon-based active material was less than 0.1 wt %, the energy density was relatively lowered.

[Evaluation Example 5] Measurement of Pore Size and Crystallite Size of Porous Structure (1) Examples 16 and 17

An anode, a half cell and a lithium secondary battery were prepared by the same method as that in Example 1, except that a temperature and a stirring time during the synthesis of the resol oligomer and a firing temperature in the carbonization and activation were modified such that porous struc- Specific XRD analysis equipment/conditions are as described in Table 8 below.

TABLE 8

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

3) Measurement of Volume Expansion Ratio Relative to Capacity

The half-cell prepared according to each of Examples 1, 16, and 17 were charged (CC/CV 0.1C 0.01V (vs. Li) 0.01C CUT-OFF) at room temperature (25° C.). An increase of an anode volume after the charging relative to an initial anode volume was calculated as a percentage, and divided by a charge capacity to evaluate a volume expansion ratio.

4) Evaluation on Rapid Charge Life-Span Properties

Rapid charge life-span properties of the secondary batteries according to Examples 1, 16 and 17 after 100 cycles were evaluated by the same method as that in (4) of Evaluation Example 1, The evaluation results are shown in Table 9 below.

TABLE 9

| No. | pore size (nm) | crystallite size (nm) | volume expansion ratio (%)/ charge capacity (mAh/g) | rapid charge capacity retention (100 cycles, %) |
|---|---|---|---|---|
| Example 1 | 9 | amorphous | 3.1 | 98.30 |
| Example 16 | 20.8 | 6.8 | 5.5 | 94.8 |
| Example 17 | 11 | 7.2 | 4.0 | 93.5 |

Referring to Table 9, in Example 1 where amorphous silicon was deposited on the carbon-based particles including pores having a size of 20 nm or less, the volume expansion ratio was reduced, and the capacity retention was improved.

In Example 16 where the pore size exceeded 20 nm, the side reaction of the silicon particles and the electrolyte solution was increased. Accordingly, the volume expansion ratio was increased, and the capacity retention was relatively lowered compared to those from Example 1.

In Example 17 where the crystallite size exceeded 7 nm, mechanical stability of the porous structure during the pressing process or repeated charging and discharging was relatively degraded. Accordingly, the capacity retention rate was relatively lowered compared to that from Example 1.

[Evaluation Example 6] Battery Properties According to Content of Porous Structure (1) Examples 18 to 22

An anode, a half cell and a lithium secondary battery were prepared by the same method as that in Example 1, except that a content of the porous structure based on the total weight of the second anode active material layer was modified as shown in Table 10 below.

(2) Evaluation Method

1) Evaluation of Volume Expansion Ratio

An anode volume expansion ratio was measured for each anode prepared in Examples 1 and 18 to 22 by the same method as that in (2) of Evaluation Example 1.

2) Evaluation on Energy Density

Energy densities of the lithium secondary batteries prepared in Examples 1 and 18 to 22 were measured by the same method as that in (2) 1) of Evaluation Example 3.

3) Evaluation on Rapid Charge Life-Span Properties

Rapid charge life-span properties of the secondary batteries according to Examples 1 and Examples 18 to 22 after 100 cycles were evaluated by the same method as that in (4) of Evaluation Example 1.

4) Evaluation on Normal Charge Life-Span Properties

Rapid charge life-span properties of the secondary batteries according to Examples 1 and Examples 18 to 22 after 100 cycles were evaluated by the same method as that in (2) 4) of Evaluation Example 4.

The evaluation results are shown in Table 10.

TABLE 10

| No. | porous structure content (wt %) | volume expansion ratio (%) | volume-energy density (Wh/L) | rapid charge capacity retention (100 cycles, %) | normal charge capacity retention (500 cycles, %) |
|---|---|---|---|---|---|
| Example 1 | 9.0 | 22.0 | 715 | 98.30 | 93.3 |
| Example 18 | 6.0 | 20.5 | 704 | 98.59 | 92.9 |
| Example 19 | 30.0 | 29.4 | 730 | 97.71 | 92.7 |
| Example 20 | 35.0 | 30.8 | 734 | 97.49 | 92.7 |
| Example 21 | 40.0 | 39.1 | 748 | 95.20 | 91.9 |
| Example 22 | 0.05 | 14.5 | 694 | 98.41 | 93.7 |

Referring to Table 10, in Examples 1 and 18 to 20, the volume expansion ratio, the energy density and the capacity retention were improved. As the content of the porous structure increased, the volume expansion ratio and the energy density were increased, and the capacity retention was decreased.

In Example 21 where the content of the porous structure exceeded 35 wt %, the volume expansion ratio was relatively increased, and the capacity retention was relatively decreased.

In Example 22 where the content of the porous structure was less than 0.1 wt %, the energy density was relatively lowered.

In some example embodiments of the disclosed technology, mechanical stability, power and life-span properties of the lithium secondary battery may be improved by adjusting the composition and material of the first anode active material layer and the second anode active material layer according to the above-described conditions.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. An anode for a lithium secondary battery, comprising:

an anode current collector;

a first anode active material layer disposed on at least one surface of the anode current collector, the first anode active material layer comprising a graphite-based active material and a silicon-based active material doped with a metal element; and a second anode active material layer disposed on the first anode active material layer, the second anode active material layer comprising a porous structure, wherein the porous structure includes a carbon-based particle and a silicon-containing coating, wherein the carbon-based particle includes pores and the silicon-containing coating disposed on a surface of the carbon-based particle.

2. The anode according to claim 1, wherein a content of the metal element doped in the silicon-based active material is in a range from 7 wt % to 17 wt % based on a total weight of the silicon-based active material.

3. The anode according to claim 1, wherein the metal element comprises Mg.

4. The anode according to claim 3, wherein the metal element further comprises at least one of Li, Al, Ca, Fe, Ti or V.

5. The anode according to claim 1, wherein the metal element comprises Mg, wherein a Mg1s of a surface of the silicon-based active material satisfies Formula 1:

$$P_{Mg}/(P_{Mg}+P_{MgO}) \leq 0.6 \quad \text{[Formula 1]}$$

wherein, in Formula 1, $P_{Mg}$ represents an area of a 1303 eV peak in the Mg1s spectrum, and $P_{MgO}$ represents an area of a 1304.5 eV peak of the Mg1s spectrum.

6. The anode according to claim 1, wherein a content of the silicon-based active material is in a range from 0.1 wt % to 35 wt % based on a total weight of the first anode active material layer.

7. The anode according to claim 1, wherein the silicon-based active material comprises a silicon-based active material particle and a carbon coating formed on the silicon-based active material particle.

8. The anode according to claim 1, wherein the graphite-based active material comprises artificial graphite and natural graphite, and a weight of natural graphite included in the first anode active material layer is equal to or less than a weight of artificial graphite included in the first anode active material layer.

9. The anode according to claim 8, wherein a ratio of the weight of natural graphite included in the first anode active material layer relative to the weight of artificial graphite included in the first anode active material layer is in a range from 0.025 to 1.

10. The anode according to claim 1, wherein the second anode active material layer further comprises artificial graphite and natural graphite, and a weight of natural graphite included in the second anode active material layer is equal to or less than a weight of artificial graphite included in the second anode active material layer.

11. The anode according to claim 10, wherein a ratio of the weight of natural graphite included in the second anode active material layer relative to the weight of artificial graphite included in the second anode active material layer is in a range from 0.025 to 1.

12. The anode according to claim 1, wherein a content of the porous structure is in a range from 0.1 wt % to 35 wt % based on a total weight of the second anode active material layer.

13. The anode according to claim 1, wherein a thickness of the second anode active material layer is 0.5% to 50% of a total thickness of the first anode active material layer and the second anode active material layer.

14. The anode according to claim 1, wherein the carbon-based particle included in the porous structure comprises at least one selected from the group consisting of an activated carbon, a carbon nanotube, a carbon nanowire, graphene, a carbon fiber, carbon black, graphite, a porous carbon, a pyrolyzed cryogel, a pyrolyzed xerogel and a pyrolyzed aerogel.

15. The anode according to claim 1, wherein a pore size of the pores included in the carbon-based particle is 20 nm or less.

16. The anode according to claim 1, wherein silicon included in the silicon-containing coating has an amorphous structure.

17. A lithium secondary battery, comprising:

an anode; and a cathode facing the anode, wherein the anode comprises:

an anode current collector;

a first anode active material layer disposed on at least one surface of the anode current collector, the first anode active material layer comprising a graphite-based active material and a silicon-based active material doped with a metal element; and a second anode active material layer disposed on the first anode active material layer, and comprising a porous structure that includes a carbon-based particle including pores and a silicon-containing coating, wherein the silicon-containing coating is disposed on a surface of the carbon-based particle.

* * * * *